(12) United States Patent
Dyle et al.

(10) Patent No.: US 9,527,420 B2
(45) Date of Patent: Dec. 27, 2016

(54) VEHICLE SEAT COVER FOR RETAINING AN OBJECT

(71) Applicant: GM GLOBAL TECHNOLOGY OPERATIONS LLC, Detroit, MI (US)

(72) Inventors: Taryn E. Dyle, Detroit, MI (US); Bruce L. Stone, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 78 days.

(21) Appl. No.: 14/541,914

(22) Filed: Nov. 14, 2014

(65) Prior Publication Data

US 2016/0137138 A1 May 19, 2016

(51) Int. Cl.
*B60N 2/64* (2006.01)
*B60N 2/58* (2006.01)
*B60R 11/02* (2006.01)
*B60R 11/00* (2006.01)

(52) U.S. Cl.
CPC . *B60N 2/64* (2013.01); *B60N 2/58* (2013.01); *B60R 11/02* (2013.01); *B60R 2011/0015* (2013.01)

(58) Field of Classification Search
CPC ............. B60R 7/08; B60R 11/02; B60N 2/58; B60N 2/64
USPC .......................... 297/188.01, 188.04; 224/275
See application file for complete search history.

(56) References Cited

U.S. PATENT DOCUMENTS

| | | | | |
|---|---|---|---|---|
| 2,223,532 A | * | 12/1940 | Sallop | B60N 2/58 224/275 |
| 5,004,295 A | * | 4/1991 | Inoue | B60N 2/44 297/188.07 X |
| 6,971,716 B2 | * | 12/2005 | DePaulis | B60N 2/60 297/188.01 |
| 8,967,712 B2 | * | 3/2015 | Yasuda | B60N 2/58 297/188.04 |
| 2012/0097831 A1 | * | 4/2012 | Olukotun | F16M 11/041 248/688 |
| 2015/0343957 A1 | * | 12/2015 | Narayanan | B60R 11/02 224/275 X |

* cited by examiner

*Primary Examiner* — Anthony D Barfield
(74) *Attorney, Agent, or Firm* — Quinn Law Group, PLLC

(57) ABSTRACT

A seat assembly is provided that includes a seat cover having a base panel with a rear-facing surface and first and second opposing lateral extremities. The seat cover has a first panel that is secured to the base panel and at least partially overlays the base panel. The first panel has a first free end that defines a first pocket that opens toward the first lateral extremity. The seat cover also includes a retaining member that is secured to the base panel and at least partially overlays the base panel. The retaining member is spaced laterally on the base panel from the first panel and is configured with a free midportion that can be selectively liftable away from the base panel. The free midportion is aligned with the first pocket for retaining an object between the first panel and the retaining member.

17 Claims, 4 Drawing Sheets

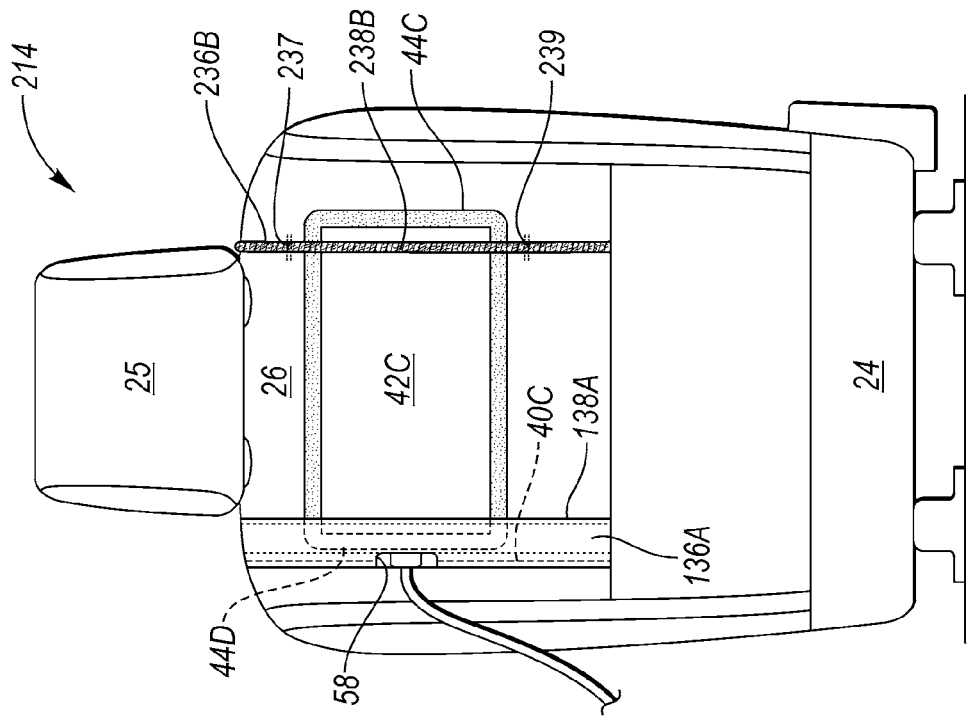
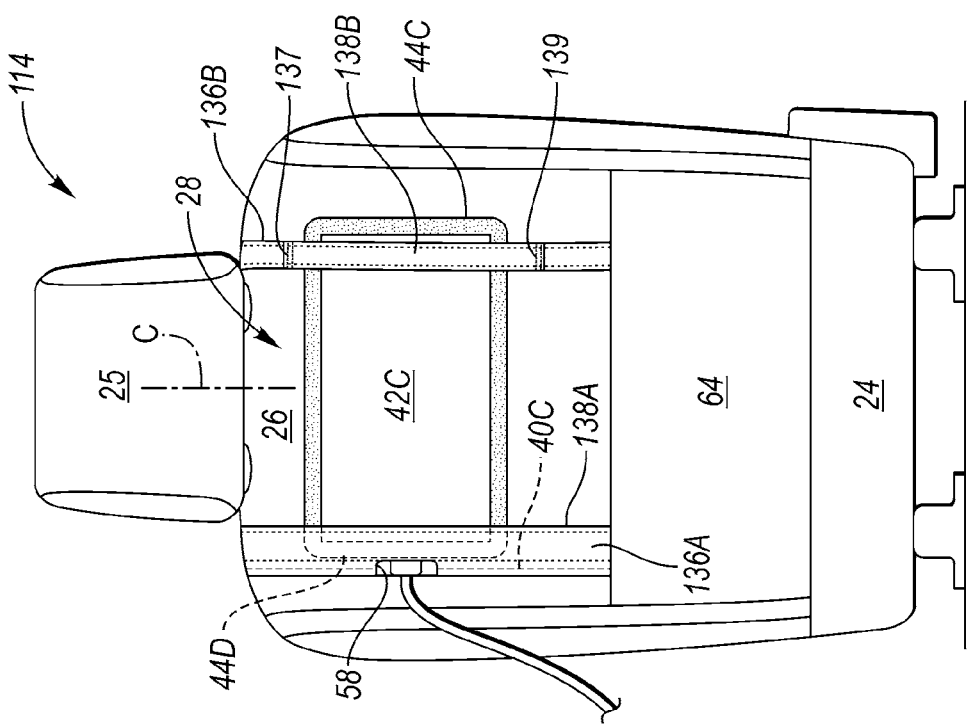

VEHICLE SEAT COVER FOR RETAINING AN OBJECT

TECHNICAL FIELD

The present teachings generally include a vehicle seat assembly having a seat cover, and a vehicle with a seat assembly.

BACKGROUND

Use of electronic devices such as laptops, tablets, and cell phones is prevalent. People often use such devices when seated. For example, passengers in vehicles, airplanes, and trains may desire to use electronic devices while travelling. The type and size of electronic devices changes frequently. Accordingly, it is difficult to design accessories for electronic devices that can be used over a wide variety of types and models.

SUMMARY

A seat assembly is provided that can securely retain an object, such as an electronic device, against a rear-facing surface of the seat assembly for use by a passenger seated rearward of the seat assembly. The seat assembly includes a seat cover that has a base panel with a rear-facing surface and first and second opposing lateral extremities. The seat cover has a first panel that is secured to the base panel and at least partially overlays the base panel. As used herein, a "panel" is a section of the material used for the seat cover, and may be a discrete piece of the material or a portion of a discrete piece. The first panel has a first free end that defines a first pocket that opens toward the first lateral extremity. The seat cover also includes a retaining member that is secured to the base panel and at least partially overlays the base panel. The retaining member is spaced laterally on the base panel from the first panel and is configured with a free midportion that can be selectively liftable away from the base panel. The free midportion is aligned with the first pocket for retaining an object between the first panel and the retaining member. Accordingly, an electronic device can be supported by the first panel and the retaining member to allow a passenger to view the electronic device in a hands free manner.

In one embodiment, the retaining member is a second panel and the midportion is a second free end that defines a second pocket that opens toward the second lateral extremity. The first and second panels can be configured to taper away from one another along the base panel such that the first and second free ends are spaced a first distance from one another at a lower portion of the base panel and a greater second distance from one another at an upper portion of the base panel. This allows objects having different widths, such as different electronic devices, to be placed in the pockets at different positions between the upper portion and the lower portion to be sufficiently secured by the first and second panels against the base panel. Accordingly, in one embodiment, the vehicle seat assembly may include a seat cover with a rear-facing surface and first and second pockets spaced from one another and opening at least partially toward one another to hold an object in the pockets against the rear-facing surface. In other embodiments, the retaining member can be an elongated strap or a stretchable cord, such as an elastic cord. A vehicle having the seat assembly is also provided.

The first panel may have a first layer, such as an exposed outer layer, and a second layer such as an inner layer that faces the rear-facing surface of the base panel in the first pocket. The second layer has a greater coefficient of friction than the first layer to help retain an object inserted into the first pocket without relative sliding of the object with respect to the second layer. In embodiments that have a retaining member that is a second panel, the second panel may also be configured with a similar first layer and second layer.

The first panel can be configured to have an aperture spaced from the first free end and opening to the first pocket. For example, a power cord may be extended through the aperture to access an electronic device in the first pocket. The seat cover can have a third panel secured to and at least partially overlaying the base panel. The third panel can have an additional free end that opens toward an upper portion of the base panel to define a map pocket.

The various embodiments of seat assemblies and seat covers disclosed herein provide a convenient, user-friendly support for objects such as electronic devices. The seat covers are versatile, as they are configured to retain a variety of different sized objects, such as electronic devices of different widths.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 6 is a schematic rear view illustration of an alternative embodiment of a seat assembly with an alternative seat cover supporting an electronic device in accordance with an alternative aspect of the present teachings.

FIG. 7 is a schematic rear view illustration of another alternative embodiment of a seat assembly with another alternative seat cover supporting an electronic device in accordance with an alternative aspect of the present teachings.

DETAILED DESCRIPTION

Figure 1:
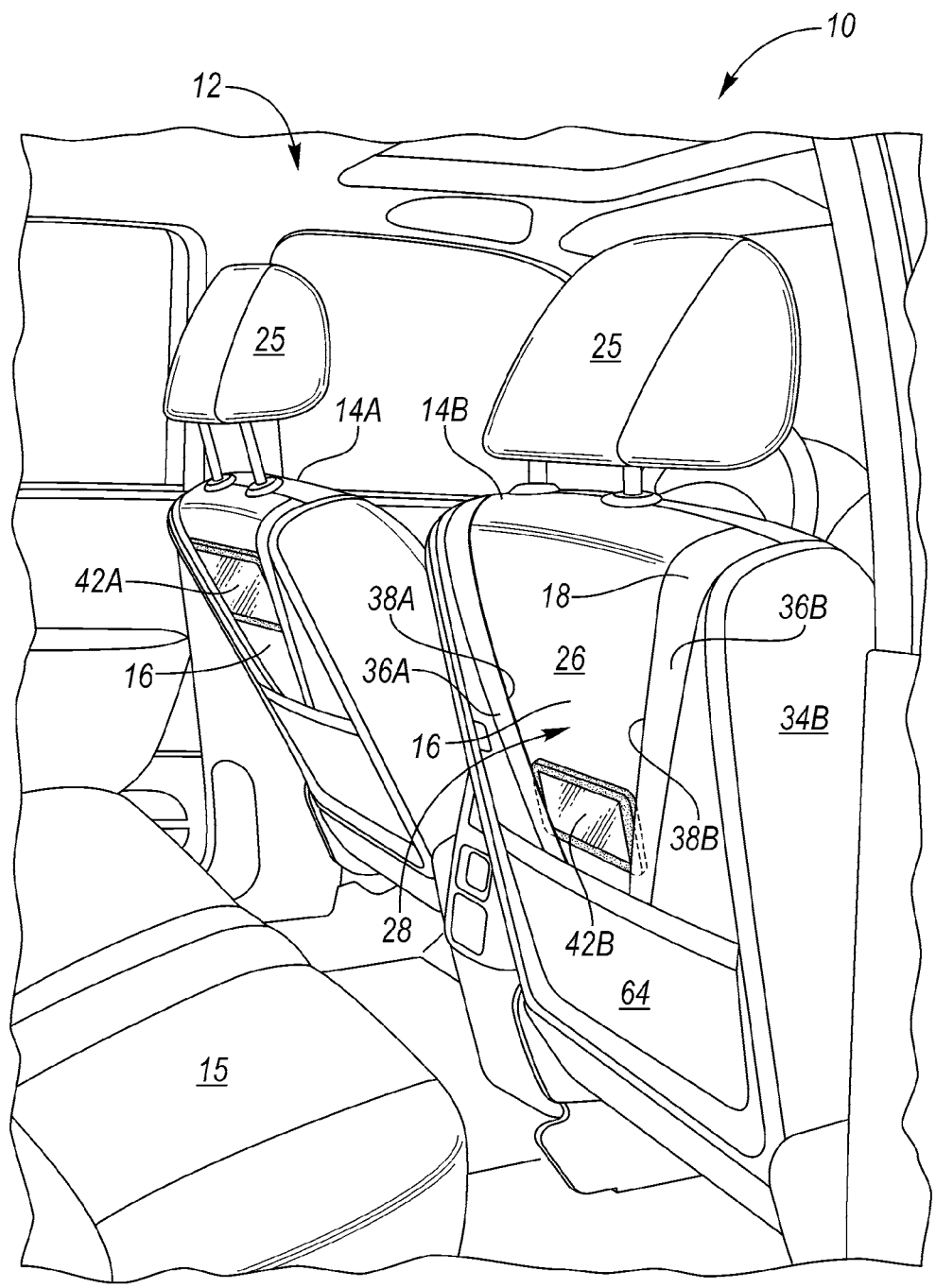
FIG. 1 is a schematic perspective illustration of a vehicle having seat assemblies with seat covers in accordance with the present teachings.

Referring to the drawings, wherein like reference numbers refer to like components throughout the views, FIG. 1 shows a vehicle 10 having a passenger compartment 12 in which a driver's side front seat assembly 14A and a passenger side front seat assembly 14B are positioned. As further discussed herein, each of the front seat assemblies 14A, 14B has a seat cover 16 adapted to securely and conveniently support electronic devices of a variety of different sizes for use by a vehicle occupant seated rearward of the seat assembly 14A or 14B, such as an occupant seated in a vehicle rear seat 15, shown partially in FIG. 1.

Figure 2:
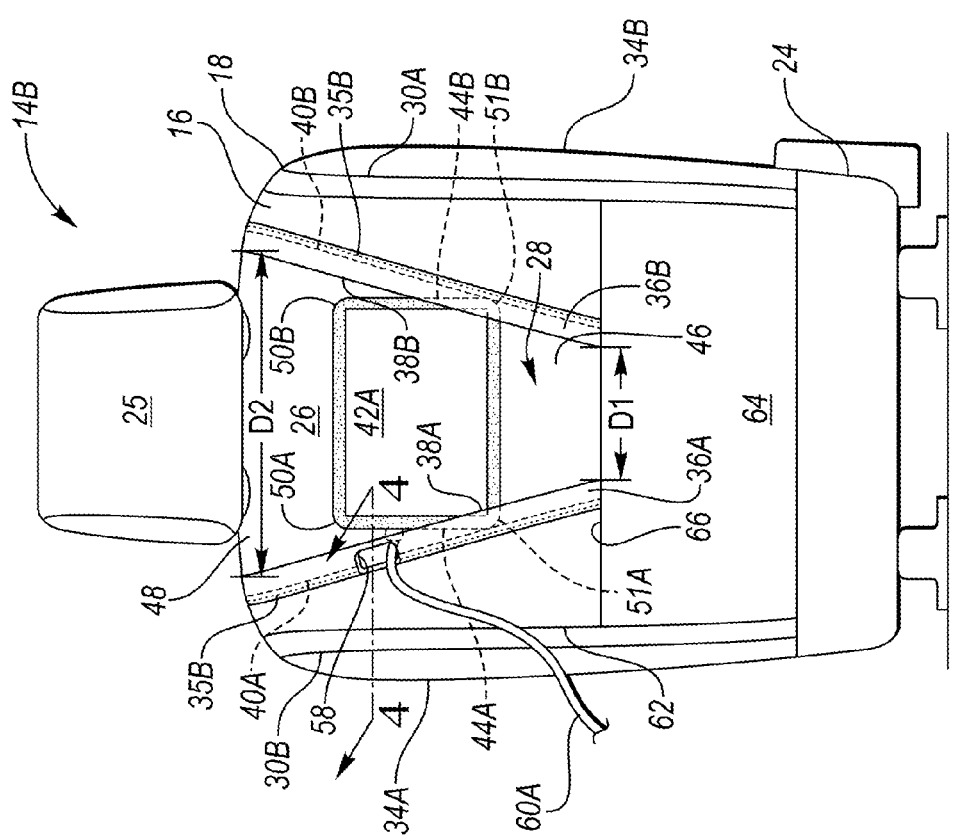
FIG. 2 is a schematic rear view illustration of one of the seat assemblies of FIG. 1 with the seat cover supporting a first electronic device.

FIG. 2 shows the seat assembly 14B with seat cover 16. The seat assembly 14A also has a seat cover 16 with identical features as described with respect to seat cover 16 of the seat assembly 14B. More specifically, the seat cover 16 is shown in FIG. 2 covering a seat back 18 of the seat assembly 14B. The seat back 18 is shown in partial cross-sectional view in FIG. 4. The seat back 18 includes the cover 16, a frame 20, and cushioning material 22, as is understood by those skilled in the art. The seat assembly 14B also includes a seat bottom 24, and a head rest 25 extending from the seat back 18.

Figure 4:
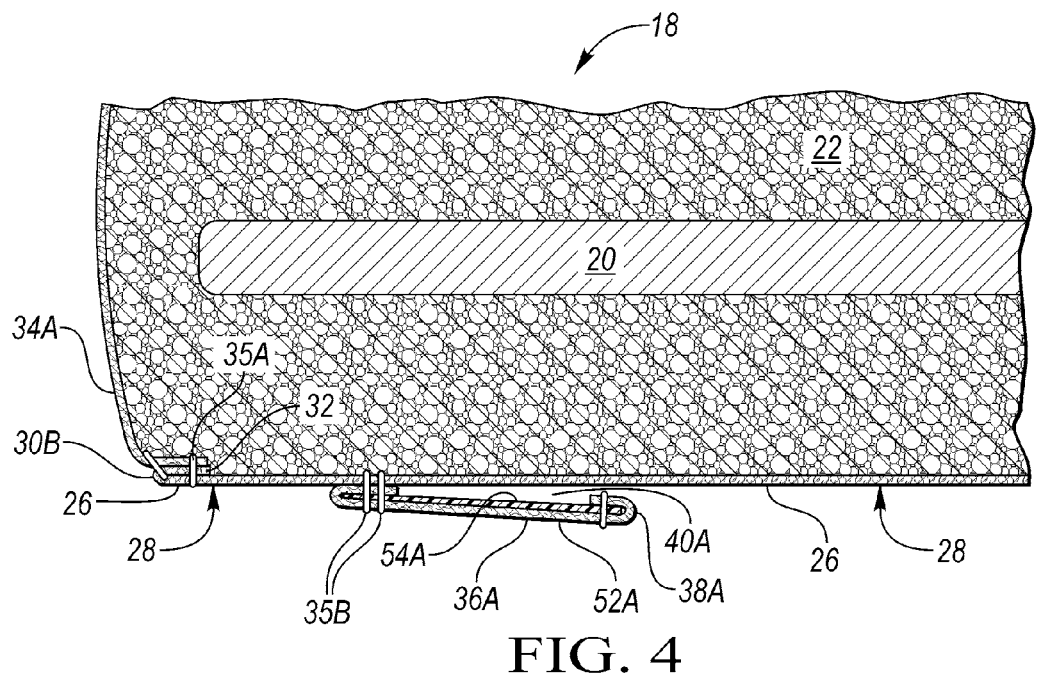
FIG. 4 is a schematic illustration in fragmentary cross-sectional view of the seat assembly of FIG. 2 taken at lines 4-4 in FIG. 2.

The seat cover 16 has multiple panels stitched or otherwise secured to one another to cover the seat back 18 and the seat bottom 24. For example, the seat cover 16 includes a base panel 26 partially covering the seat back 18. The base panel 26 has a rear-facing surface 28. The base panel 26 covers a rear side of the seat back 18 so that the rear-facing surface 28 faces the rear seat 15 of FIG. 1. The base panel 26 has a first lateral extremity 30A defining one peripheral edge of the rear-facing surface 28 and an opposing second lateral extremity 30B defining another peripheral edge of the rear-facing surface 28. The lateral extremities 30A, 30B may or may not be the edges of the base panel 26. For example, the base panel 26 can be folded over at the lateral extremities 30A, 30B. FIG. 4 shows a lateral edge 32 of the base panel 26 which is displaced laterally inward from the second lateral extremity 30B because the base panel 26 is folded along the second lateral extremity 30B. The base panel 26 is stitched or otherwise secured to a first side panel 34A near the second lateral extremity 30B, as shown with stitching 35A in FIG. 4. Similarly, the base panel 26 is stitched or otherwise secured to the second side panel 34B near the first lateral extremity 30A.

The cover 16 also includes a first panel 36A secured to the base panel 26. The first panel 36A may be a separate panel from the base panel 26 stitched to the base panel 26 at stitching 35B, as shown in FIG. 4. In other embodiments, the first panel 26 could be an integral portion of the base panel 26 formed by a fold of the base panel 26. The first panel 36A overlays a portion of the base panel 26 on the rear-facing surface 28. As shown in FIG. 2, the first panel 26 has a first free end 38A. The first free end 38A is referred to as "free" as it has a portion that is not stitched or bound to the base panel 26 so that it can be lifted away from the rear-facing surface 28. The first panel 36A thus defines a first pocket 40A, best shown in FIG. 4, which opens at the first free end 38A toward the first lateral extremity 30A.

The cover 16 also has a retaining member 36B secured to the base panel 26 and at least partially overlaying a portion of the base panel 26 on the rear-facing surface 28. The retaining member 36B is spaced laterally on the base panel 26 from the first panel 36A and is configured with a free midportion 38B that can be selectively lifted away from the base panel 26 and aligned with the first pocket 40A. More specifically, in the embodiment of FIGS. 1-5, the retaining member 36B is a second panel 36B similar to the first panel 36A, and the free midportion 38B is a second free end 38B similar to the first free end 38A. The second panel 36B is secured to the base panel 26 similarly as described with respect to the first panel 36A, or may be integrally formed by a fold in the base panel 26. The second free end 38B defines a second pocket 40B that opens at the second free end 38B toward the second lateral extremity 30B. The first pocket 40A and the second pocket 40B are thus spaced from one another along the rear-facing surface 28, and open generally toward one another. This enables an object to be placed and held in the first and second pockets 40A, 40B, spanning across the rear-facing surface 28 between the pockets 40A, 40B, and thereby retained against the rear-facing surface 28 of the base panel 26. The object is also selectively removable from the pockets 40A, 40B of the cover 16 by lifting the free ends 38A, 38B to remove the object.

For example, in FIG. 2, the object retained by the cover 16 may be an electronic device 42A, such as an electronic tablet, laptop, cell phone, electronic game device, etc. Alternatively, other objects that are not electronic, such as a book, a picture, or other relatively flat object can be retained by the cover 16. To enable the cover 16 to retain the object, such as the electronic device 42A, a first end 44A of the electronic device 42A is tucked into the first pocket 40A by a vehicle occupant manually lifting the first free end 38A and sliding the first end 44A into the first pocket 40A. A second end 44B of the electronic device 42A is tucked into the second pocket 40B by lifting the second free end 38B and sliding the second end 44B into the second pocket 40B.

As shown in FIG. 2, the first and second panels 36A, 36B are configured to taper away from one another along the base panel 26 such that the first and second free ends 38A, 38B are spaced a first distance D1 from one another at a lower portion 46 of the base panel 26 and a second distance D2 from one another at an upper portion 48 of the base panel 26. The second distance D2 is greater than the first distance D1. As a non-limiting example, in the embodiment of FIG. 2, the second distance D2 is at least twice as great as the first distance D1. Configuring the first and second panels 36A, 36B to taper away from one another has several advantages. First, the ends 44A, 44B of the electronic device 42A can be inserted into the pockets 40A, 40B closer to the upper portion 48 of the base panel 26, where the distance D2 between the free ends 38A, 38B is relatively large. For example, an occupant of the rear seat 15 can manually insert the ends 44A, 44B into the pockets 40A, 40B one at a time. The free ends 38A, 38B then will not need to be lifted as far from the rear-facing surface 28, and the electronic device 42A can be slid in the pockets 40A, 40B across the rear-facing surface 28 from the upper portion 48 toward the lower portion 46 of the base panel 26. The lower corners 51A, 51B are within the pockets 40A, 40B. The upper corners 50A, 50B of the electronic device need not be within the pockets 40A, 40B for the electronic device 42A to be securely retained by the seat back 18. In one example, the panels 36A, 36B may be arranged so that the distances D1, D2 and the width of the pockets 40A, 40B enable approximately two thirds of the ends 44A, 44B to be in the pockets 40A, 40B for an electronic device 42A with a standard aspect ratio.

Figure 3:
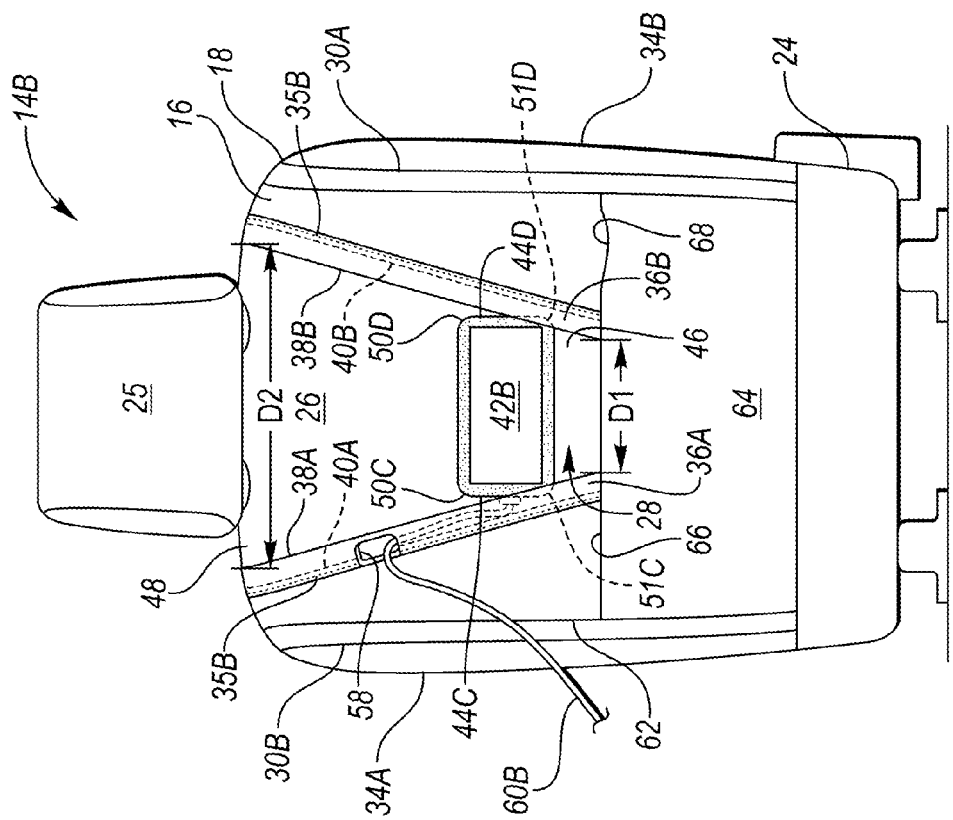
FIG. 3 is a schematic rear view illustration of the seat assembly of FIG. 2 with the seat cover supporting a second electronic device.

The tapered nature of the panels 36A, 36B also provides versatility. With reference to FIG. 3, the panels 36A, 36B tapering away from one another allow an electronic device 42B of a smaller size than the electronic device 42A to be retained in an equally secure manner by the cover 16. For example, a vehicle occupant can manually insert the electronic device 42B into the pockets 40A, 40B and slide the electronic device 42B further toward the lower portion 46 of the base panel 26, as the electronic device 42B is narrower in width. Because the free ends 38A, 38B are closer to one another toward the lower portion 46, the pockets 40A, 40B are able to hold the ends 44C, 44D of the smaller electronic device 42B with the lower corners 51C, 51D in the pockets 40A, 40B. The upper corners 50C, 50D of the electronic device 42B need not be within the pockets 40A, 40B for the electronic device 42B to be securely retained by the seat back 16. In one example, the panels 36A, 36B may be arranged so that the distances D1, D2 and the width of the pockets 40A, 40B enable approximately two thirds of the ends 44A, 44B to be in the pockets 40A, 40B for an electronic device 42B with a standard aspect ratio. In other embodiments, the free ends 38A, 38B could be arranged generally parallel to one another on the rear-facing surface 28 so that the first and second panels 36A, 36B do not taper away from one another.

Figure 5:
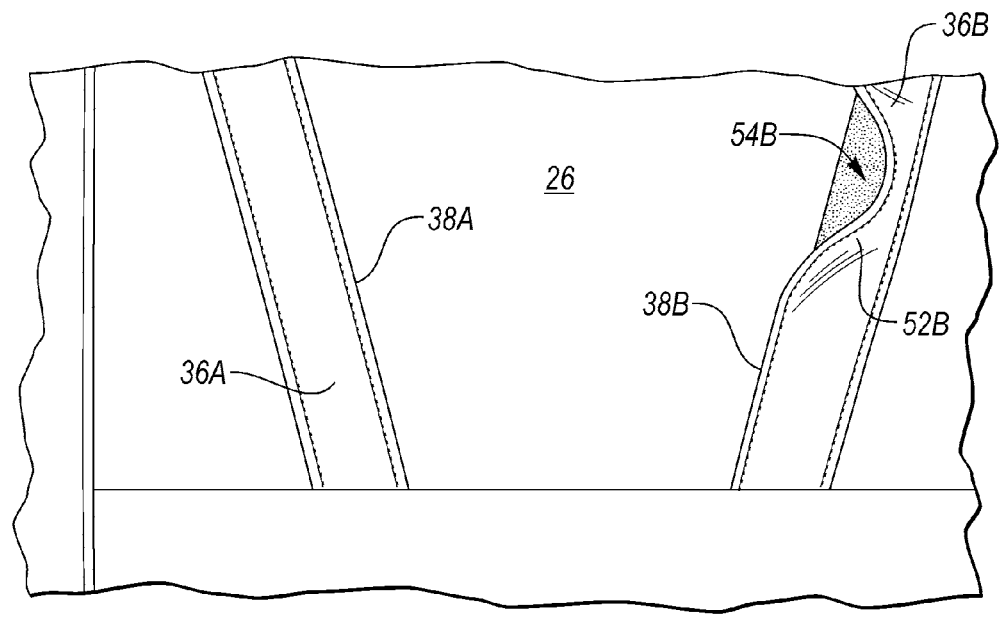
FIG. 5 is a schematic fragmentary view of the seat cover of FIG. 2 showing an underside of one of the cover panels.

The first and second panels 36A, 36B are further configured to securely retain an object in the pockets 40A, 40B by providing the panels 36A, 36B with a material that has a relatively high coefficient of friction when in contact with an object in the pockets 40A, 40B. More specifically, as shown in FIG. 4, the first panel 36A has a first layer 52A and a second layer 54A. The first layer 52A is also referred to as an outer layer and the second layer 54A is also referred to as an inner layer. The first layer 52A is exposed and the second layer 54A faces the rear-facing surface 28 of the base panel 26 in the first pocket 40A. The second layer 54A has a greater coefficient of friction than the first layer 52A. For example, the first layer 52A and the base panel 26 are a first material, which may include fabrics including cloth, leather, or other materials. The second layer 54A is a second material that may include rubber, such as a rubber-coated layer, a rubberized fabric, a highly textured material, or other material with a relatively high coefficient of friction. Accordingly, when a relatively smooth surface, such as a plastic or metal surface of an electronic device 42A is moved relative to the second layer 54A, the second layer 54A helps to maintain the placement of the electronic device 42A or 42B within the pockets 40A, 40B. More specifically, the second layer 54A helps to maintain the vertical insertion position of the electronic device 42A or 42B between the upper portion 48 and the lower portion 46 of the base panel 26. FIG. 5 shows that the second panel 36B is also configured with a first layer 52B and a second layer 54B configured like the first layer 52A and the second layer 54A, respectively.

As best shown in FIGS. 2 and 3, the cover 16 may be configured to permit access for charging or powering the electronic device 42A or 42B when it is secured in the pockets 40A, 40B. For example, FIG. 2 shows that the first panel 36A has an aperture 58 that extends through the first panel 36A. The aperture 58 is spaced from the first free end 38A. The aperture 58 thus permits access to the first pocket 40A. In FIG. 2, a power cord 60A is shown in fragmentary view extending through the aperture 58 from outside of the pocket 40A into the pocket 40A and connecting to the electronic device 42A. For example, the other end of the power cord 60A may be inserted into an auxiliary power port (not shown) on the vehicle 10 for powering or charging the electronic device 42A. FIG. 3 shows that aperture 58 is placed in a position generally between the lower portion 46 and the upper portion 48 so that a power cord 60B for the lower-placed and smaller electronic device 42B also fits through the aperture 58 to access the electronic device 42B.

The aperture 58 is shown placed near an outer lateral extremity 62 of the first panel 36A. The aperture 58 could instead be placed in a midportion of the first panel 36A, between the outer lateral extremity 62 and the free end 38A, or could be placed in the second panel 36B. Still further, both the first panel 36A and the second panel 36B could have apertures 58 or multiple apertures 58 of the same or different sizes could be provided on one or both panels 36A, 36B.

As shown in FIGS. 2 and 3, the cover 16 can also be configured with a third panel 64 that is secured to and at least partially overlays the base panel 26. The third panel 64 is below the lower portion 46 of the base panel 26. The third panel 64 has an additional free end 66 that opens toward the upper portion 48 of the base panel 26. In other words, the free end 66 forms a generally upward-facing opening 68 when the free end 66 is lifted away (i.e., outward) from the base panel 26 and the first and second panels 36A, 36B, as illustrated in FIG. 3. A vehicle occupant can manually lift the free end 66. The opening 68 can be referred to as a map pocket 68 as it may be used to store maps or other objects. Because the opening 68 is directly below the free ends 38A, 38B, it could function as a protective catch for the electronic devices 42A, 42B should they unintentionally slide downward in the pockets 40A, 40B. Alternatively, a lower portion of each pocket 40A, 40B could be closed by a seam of the panels 36A, 36B to the base panel 26, preventing the electronic devices 42A, 42B from being positioned or moving lower than the seam in the pockets 40A, 40B.

FIG. 6 shows another embodiment of a vehicle seat assembly 114. Components of the vehicle seat assembly 114 that are identical in configuration and function to those of vehicle seat assembly 14B of FIGS. 2-5 are labelled with identical reference numbers and are as described with respect to FIGS. 2-5. The seat assembly 114 has a first panel 136A identical to first panel 36A except that the free end 138A is at less of an angle with respect to a center longitudinal axis C of the base panel 26 in that it does not taper significantly laterally outward from a lowest extent to a highest extent. When lifted, the free end 138A creates an opening to a first pocket 40C. The seat assembly 114 has a retaining member 136B that is an elongated strap secured to the base panel 26 at a first portion 137 and at a second portion 139 with a free midportion 138B between the first portion 137 and the second portion 139. The retaining member 138B can be leather or other suitable material. The free midportion 138B is selectively movable away from the rear-facing surface 28 of the base panel 26 such as by a vehicle occupant manually lifting the free midportion 138B. This allows the end 44C of an electronic device 42C to be inserted under the lifted free midportion 138B, and the electronic device 42C to slide into a space between the free midportion 138B and the base panel 26. The other end 44D of the electronic device 42C is inserted into the first pocket 40C. The lifted retaining member 136B is then released. The retaining member 136B is configured to have sufficient tension to retain the electronic device 42C securely against the rear-facing surface 28.

FIG. 7 shows another embodiment of a vehicle seat assembly 214. Components of the vehicle seat assembly 114 that are identical in configuration and function to those of vehicle seat assembly 14B of FIGS. 2-5 or of vehicle seat assembly 114 of FIG. 6 are labelled with identical reference numbers and are as described with respect to FIG. 2-5 or 6. The seat assembly 214 has a retaining member 236B that is a stretchable cord secured to the base panel 26 at a first portion 237 above a free midportion 238B and secured to the base panel 26 at a second portion 239 below the free midportion 238B. The retaining member 238B can be an elastic cord. For example, the retaining member 238B may have elastic strands forming a core covered in a woven cotton or polypropylene sheath. The free midportion 238B is selectively liftable away from the rear-facing surface 28 of the base panel 26. This allows the end 44C of the electronic device 42C to be inserted under the lifted free midportion 238B, and the electronic device 42C to be slid into a space between the free midportion 238B and the base panel 26. The retaining member 236B is then released. The other end 44D of the electronic device 42C is inserted into the first pocket 40C. The retaining member 236B is configured to have sufficient tension when the midportion 238B is released to retain the electronic device 42A securely against the rear-facing surface 28.

Although, the seat assemblies 14A, 14B, 114 and 214 are shown retaining electronic devices 42A, 42B, and 42C on the seat back 18, the panels 36A, 36B or panel 136A, retaining members 138B or 238B could instead be a cover on the head rest 25 for retaining relatively small objects and electronic devices, such as cell phones.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A seat assembly comprising:
a seat cover having:
a base panel having a rear-facing surface and first and second opposing lateral extremities;
a first panel secured to the base panel and at least partially overlaying the base panel; wherein the first panel has a first free end to define a first pocket that opens at the first free end toward the first lateral extremity;
a retaining member secured to the base panel and at least partially overlaying the base panel;
wherein the retaining member is spaced laterally on the base panel from the first panel and is configured with a free midportion selectively liftable away from the base panel and aligned with the first pocket for retaining an object between the first panel and the retaining member;
wherein the first panel and the retaining member taper away from one another along the base panel such that the first free end and the free midportion are spaced a first distance from one another at a lower portion of the base panel and a second distance from one another at an upper portion of the base panel; and wherein the second distance is greater than the first distance.

2. The seat assembly of claim 1, wherein the retaining member is an elongated strap secured to the base panel at a first portion above the free midportion and at a second portion below the free midportion.

3. The seat assembly of claim 1, wherein the retaining member is a stretchable cord secured to the base panel at a first portion above the free midportion and at a second portion below the free midportion.

4. The seat assembly of claim 1, wherein the retaining member is a second panel secured to the base panel and at least partially overlaying the base panel; wherein the free midportion of the retaining member is a second free end of the second panel that defines a second pocket that opens at the second free end toward the second lateral extremity.

5. The seat assembly of claim 1, wherein the second distance is at least twice as great as the first distance.

6. The seat assembly of claim 1, wherein the first panel has a first layer and a second layer; wherein the first layer is exposed; and wherein the second layer faces and is exposed to the rear-facing surface of the base panel in the first pocket to contact the object, and has a greater coefficient of friction than the first layer.

7. The seat assembly of claim 6, wherein the first layer and the base panel are a first material; wherein the second layer is a second material; wherein the first material includes one of cloth fabric and leather; and wherein the second material includes rubber.

8. The seat assembly of claim 1, wherein the first panel has an aperture spaced from the first free end and opening to the first pocket.

9. The seat assembly of claim 1, further comprising:
a third panel secured to and at least partially overlaying the base panel and having an additional free end that opens toward an upper portion of the base panel to define a map pocket; and
wherein the first panel and the retaining member are configured to retain a lower portion of the object with the lower portion of the object spaced apart from the third panel.

10. A vehicle seat assembly comprising:
a seat cover with a rear-facing surface and having a first pocket and a second pocket spaced from one another and opening at least partially toward one another to hold an object in the pockets against the rear-facing surface;
wherein the first pocket has a first free end defining a first pocket opening, and the second pocket has a second free end defining a second pocket opening; wherein the first and second free ends taper away from one another such that the first and second free ends are spaced a first distance from one another at lower portions of the first and second free ends and a second distance from one another at upper portions of the first and second free ends; and wherein the second distance is greater than the first distance.

11. The vehicle seat assembly of claim 10, wherein the second distance is at least twice as great as the first distance.

12. The vehicle seat assembly of claim 10, wherein the first and second pockets each have an exposed outer layer and an inner layer; and wherein the inner layer faces and is exposed to the rear-facing surface to contact the object and has a greater coefficient of friction than the outer layer.

13. The vehicle seat assembly of claim 12, wherein the outer layer is a first material; wherein the inner layer is a second material; wherein the first material includes one of cloth fabric and leather; and wherein the second material includes rubber.

14. The vehicle seat assembly of claim 10, wherein the pockets each have a respective free end defining a respective pocket opening; and wherein at least one of the pockets has an aperture spaced from the respective pocket opening.

15. The vehicle seat assembly of claim 10, wherein the seat cover has a map pocket having a free end that opens toward an upper portion of the seat cover; and wherein the first pocket and the second pocket are configured to hold the object with the object spaced apart from the map pocket.

16. A vehicle comprising:
a front vehicle seat assembly including:
a seat cover having:
a base panel with a rear-facing surface and first and second opposing lateral extremities;
a first panel secured to the base panel and at least partially overlaying the base panel; wherein the first panel has a first free end to define a first pocket that opens at the first free end toward the first lateral extremity;
a retaining member secured to the base panel and at least partially overlaying the base panel; and wherein the retaining member is spaced laterally on the base panel from the first panel and is configured with a free midportion selectively liftable away from the base panel and aligned with the first pocket for retaining an object between the first panel and the retaining member;

wherein the retaining member is a second panel secured to the base panel and at least partially overlaying the base panel; wherein the free midportion of the retaining member is a second free end of the second panel that defines a second pocket that opens at the second free end toward the second lateral extremity; and wherein the first and second panels taper away from one another along the base panel such that the first and second free ends are spaced a first distance from one another at a lower portion of the base panel and a second distance from one another at an upper portion of the base panel; and wherein the second distance is greater than the first distance.

17. The vehicle of claim 16, wherein the first panel has a first layer and a second layer; wherein the first layer is exposed and the second layer faces and is exposed to the rear-facing surface of the base panel in the first pocket to contact the object and has a greater coefficient of friction than the first layer.

\* \* \* \* \*